United States Patent [19]

Carlsson et al.

[11] 3,709,335
[45] Jan. 9, 1973

[54] ENERGY ABSORBER AND METHOD OF OPERATING SAME

[75] Inventors: Sixten Einar Carlsson; Lars Halvar Myhr; Lars-Ake Erling Svensson, all of Norrkoping, Sweden

[73] Assignee: Borgs Fabricks Aktiebolag, Norrkoping, Sweden

[22] Filed: Jan. 8, 1971

[21] Appl. No.: 104,963

[30] Foreign Application Priority Data

Feb. 26, 1970 Sweden.............................2518/70

[52] U.S. Cl................................................188/296
[51] Int. Cl...............................................B64f 1/02
[58] Field of Search..............188/290, 296; 244/110

[56] References Cited

UNITED STATES PATENTS 3,599,906  8/1971  Reinemuth..........................188/290

Primary Examiner—Edward A. Sroka
Attorney—Munson & Fiddler

[57] ABSTRACT

An energy absorber primarily intended for the arresting of aircraft, and a method of operating the same, said absorber having a chamber in which a liquid is pumped around a rotor and stator lattice structure having oppositely curved vanes and blades, with a portion of the liquid in a return chamber given a progressively increased tangential velocity in a potential vortex, and a remaining small portion of the liquid being passed to equal pressure channels to be combined at the rotor inlet, and the remaining portion of the liquid proceeding in a flow direction opposite to the direction of rotation of the rotor so that equal pressure flow compensates for the reduction in pressure of the vortex flow at the rotor inlet.

3 Claims, 3 Drawing Figures

PATENTED JAN 9 1973 3,709,335

INVENTORS
Sixten Einar
Carlsson, et al
BY
MUNSON & FIDDLER
ATTORNEY

ENERGY ABSORBER AND METHOD OF OPERATING SAME

The present invention relates to an apparatus and method of operating hydraulic energy absorbers, preferably absorbers used for arresting the movement of aircraft, and in which a liquid is pumped around a rotor and stator lattice structure, the blades of which are curved in opposite directions.

Absorbers of this type are used as aircraft brakes and are so constructed that the direction of flow of a liquid in a closed chamber is continuously changed by means of a rotor-stator lattice structure. With brakes of this description, the rotor imparts to the liquid a radial-tangential direction of movement. During the passage of the liquid from the rotor outlet to the rotor inlet, it is forced by a stator lattice to move substantially tangentially to the inlet in a direction opposite to the direction of movement of the rotor lattice.

BACKGROUND OF THE INVENTION

In the case of an energy absorber used for aircraft landing arrestors, the moment of inertia of the rotating members must be as low as possible. In the majority of cases the rotating members mainly consist of a band coiling device such as a winch, a rotor shaft, a rotor and the liquid present in the apparatus.

Since, for several reasons such as aircraft weight, speed and maximum-permitted retardation, it is not possible to alter the moment of inertia of the band-coiling device and rotor shaft to any appreciable extent, and it only remains to reduce the dimensions of the rotor.

The invention has reference to an apparatus and method for converting energy in such absorbers. The present invention provides a greater braking torque with a rotor of given dimensions than that obtained with systems previously known. According to the apparatus and method of the invention, the liquid flow is guided radially and tangentially to the inlet opening of the rotor in a direction opposite to the direction in which the rotor rotates, by means of a suitable vortex formed in the liquid. The so-called potential vortex is the most suitable form of vortex for this purpose.

For a given speed of rotation and a given rotor it can be said that $$M_v = k (v_1 + v_2)^2$$

where $M_v$ is the torque of the rotor
K is a constant
$v_1$ is the inlet velocity of the liquid in a tangential direction
$v_2$ is the outlet velocity of the liquid in a tangential direction
$v_1$ is contradirectional to $v_2$ This means that when the inlet velocity and the outlet velocity are equal and with the direction of flow of the liquid at the inlet being opposed to the direction of rotation of the rotor, the torque obtained is four times greater than that obtained when the velocity of the incoming liquid, tangentially to the rotor, is zero, that is, the flow of the liquid is purely radial.

The use of the potential vortex provides a considerable increase in the tangential velocity of the incoming liquid which, unless precautionary measures are taken, causes serious problems at the rotor inlet, occurring in the form of vapor formation and cavitation as a result of the low static pressure of the liquid. If the surface of the liquid is at atmospheric pressure, the low static pressure will cause a vortex to be formed at the rotor inlet, thereby causing air to be drawn into the rotor. This air causes stagnation of the flow of liquid and the torque falls. The reduced liquid flow causes a reduction in the rate of flow and thereby an increase in the static pressure at the rotor inlet. The vortex ceases with increased liquid flow and subsequently increased torque, and thereafter the cycle is repeated. The result is therefore a pulsating torque, causing the efficiency of the device to be extremely low.

The present invention rectifies this phenomenon by conducting, from the region of the liquid chamber at which a very high static pressure prevails namely, at the periphery, a small portion of the liquid and transporting this liquid in channels of equal pressure to the inlet of the rotor, where a static pressure is applied to the vortex without any appreciable reduction in the total tangential velocity of the liquid.

The result is a uniform and extremely high torque on the rotor shaft. One characteristic of liquid brakes of this kind is the low braking torque at low speed, this being shown by the equation $$M_v = k \times w^2$$

where $M_v$ is the torque
$k$ is a constant
$w$ is the angular velocity of the rotor.

This characteristic is a disadvantage when the liquid brakes are used for aircraft landing arrestors, since the braking force becomes very low at the end of the braking distance. This disadvantage is eliminated to a certain extent by using elastic line material which tends to maintain the speed of the brakes at a high level when the load is relieved.

In order to further improve the low-speed characteristics of the apparatus and to enable less elastic line material to be used, the liquid brake of the present invention is supplemented with a hydraulic pump having a suitable torque and driven from the rotor shaft. This pump discharges into a hydraulic accumulator with a very flat characteristic and the pump torque will therefore be practically independent of the speed of the rotor. The pump torque is adjusted to give a low but nevertheless appreciable addition to the braking torque at the end of the braking distance, without materially affecting the characteristic of the liquid brake apparatus.

DESCRIPTION

The invention is illustrated in the accompanying drawing in which.

Figure 1:
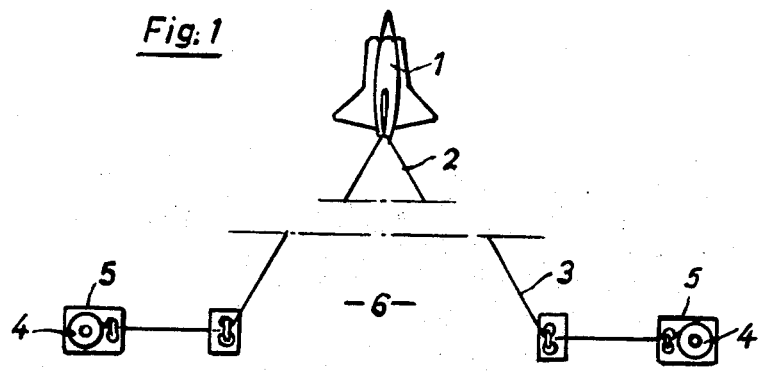
FIG. 1 shows a runway provided with aircraft landing barriers and an aircraft arrested thereby.

In FIG. 1 an aircraft is shown at 1, the same having been arrested by a hook mounted on it that has become engaged with a wire 2 connected to a brake band 3, which is unwound as the plane is brought to a stop, from a band drum 4 connected to a brake 5, one such brake being arranged on either side of a runway 6.

Figure 2:
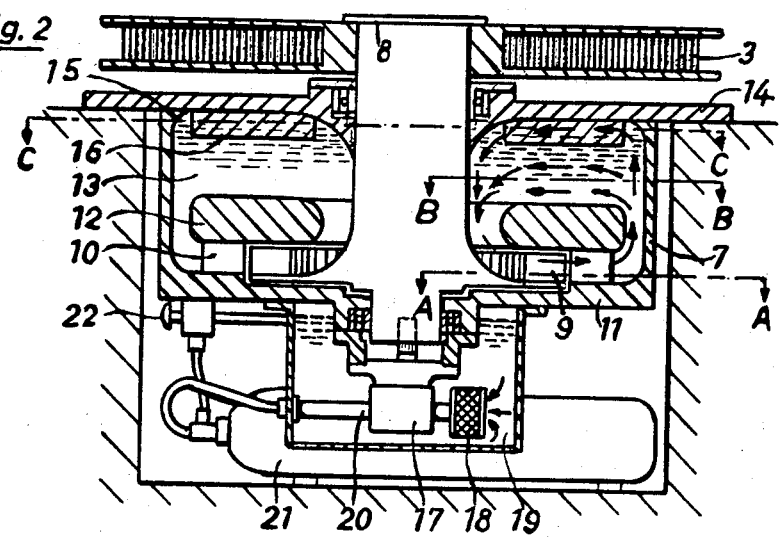
FIG. 2 is a view in vertical section of an absorber provided with a brake drum.
Figure 3:
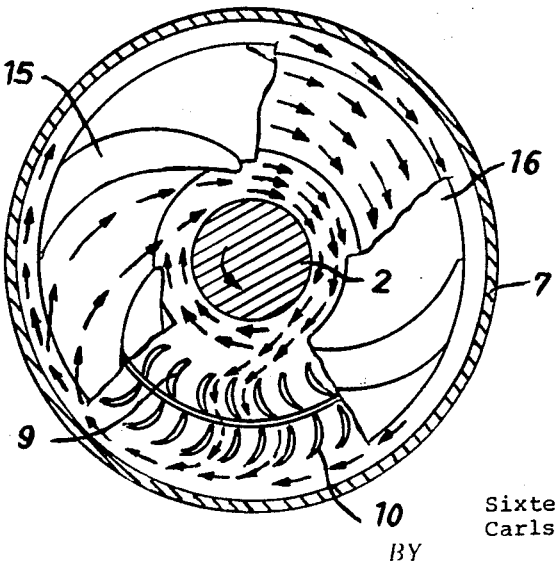
FIG. 3 is a horizontal view in section taken through the lines A—A, B—B and C—C in FIG. 2.

FIG. 2 shows an absorber installed below the surface of the runway. The absorber consists of a liquid housing 7 in which is mounted a shaft 8 that supports a band drum 4 at its upper end and at its lower end a rotor 9 in the form of a blade ring. The rotor 9 is encircled by a stationary guide vane ring 10, the vanes of which are curved in a direction opposite to that of the blades of the rotor. The blade lattice structure is located between the lower end wall 11 of the housing 7 and a ring 12 which is attached to the guide vanes on the ring 10 and forms a wall for the rotor passage. Located on the opposite side of the ring 12 is a return chamber 13 for the liquid return flow to the rotor.

Along the upper end wall 14 of the housing 7 are arranged equal pressure channels between the guide vanes 15 arranged between the end wall 14 and a wall 16, the guide vanes having channels of substantially constant cross-sectional area.

Connected to the lower end of the shaft 8 is a hydraulic pump 17, the inlet of which is provided with a strainer 18 and the pump 17 communicates with a liquid tank 19, the outlet of which is connected, by means of a pipe 20, to a liquid accumulator 21. At 22 is shown a valve by means of which the contents of the accumulator can be emptied into the tank 19.

The absorber operates in the following manner:

When an aircraft is arrested by the barrier system, the band drum 4 will begin to rotate, causing the rotor 9 to rotate and this induces the liquid to flow outwardly and substantially in a tangential direction. The flow of liquid is deflected in the guide vane ring 10 and leaves the ring in a substantially tangential direction.

In order that a state of equalibrium may exist, the liquid is forced to flow radially toward the shaft in the return chamber 13 and into the rotor as indicated by the arrows in FIG. 2. A potential vortex is formed in the chamber 13 between the ring 12 and the wall 16, having a tangential velocity component which increases a number of times toward the rotor axis. The contradirectional flow gives a substantially tangential inlet direction in the rotor lattice.

In order to raise the static pressure at the rotor inlet, a portion of the liquid in the chamber 13 is removed and is conveyed under constant pressure to the rotor inlet through the channels between the guide vanes 15.

The aircraft is braked by the torque on the shaft 8 as a result of the liquid flow, and the energy is converted to heat in the liquid. During the braking process, liquid in the tank 19 is forced into the accumulator 21 by the pump 17, a torque on the shaft 8 relatively independent of the speed thus being added to the speed-dependent torque caused by the liquid flow. When the aircraft has thus been brought to a stop, the contents of the accumulator are emptied into the tank by means of the valve 22.

What is claimed is:

1. A method of operating energy absorbers of the type in which liquid is pumped around a rotor and stator lattice structure having oppositely curved vanes and blades and which is intended for arresting the movement of aircraft, characterized in that portion of liquid in a return chamber is given a progressively increased tangential velocity in a potential vortex while a remaining smaller portion of the liquid is passed to equal pressure chambers to be combined in the rotor inlet with the remaining portion of the liquid in a flow direction which is opposite to the direction of movement of the rotor, so that the equal pressure flow compensates for the reduction in pressure of the vortex flow at the rotor inlet.

2. A rotary hydraulic energy absorber comprising:
   a. an annular housing for receiving liquid;
   b. a braking structure cooperating with the liquid in said housing to provide a retarding torque;
   c. said braking structure comprising:
      i. a drive shaft mounted centrally in said housing which supports a bladed rotor encircled by a stationary guide vane ring member;
      ii. a blade lattice structure arranged between an end wall of said housing and a second ring member;
   d. a return chamber in said housing for the recirculation of the liquid to the rotor located at the opposite side of said ring member;
   e. equal pressure channels in said housing through which a minor portion of the return liquid from the guide vane ring member is passed to the rotor inlet;
   f. said equal pressure channels being located along opposite walls of said housing.

3. An energy absorber according to claim 4, characterized in that the absorber is supplemented with a pump connected to the drive shaft and by means of which liquid is pumped from a tank to a pressure accumulator so that a certain amount of energy is also absorbed at low rotor speeds.

* * * * *